(12) United States Patent  (10) Patent No.: US 7,778,968 B2
Cherry  (45) Date of Patent: Aug. 17, 2010

(54) SYSTEMS AND METHODS FOR COMPILING APPLICATIONS ON A TEST SERVER

(75) Inventor: Sebastien Cherry, Brossard (CA)

(73) Assignee: SAP AG, Walldorf (DE)

( * ) Notice: Subject to any disclaimer, the term of this patent is extended or adjusted under 35 U.S.C. 154(b) by 356 days.

(21) Appl. No.: 11/261,581

(22) Filed: Oct. 31, 2005

(65) Prior Publication Data

US 2007/0100903 A1  May 3, 2007

(51) Int. Cl.
  *G06F 17/30* (2006.01)
  *G06F 17/00* (2006.01)
(52) U.S. Cl. .................. 707/611; 707/624; 717/168
(58) Field of Classification Search .............. 707/210; 717/168
  See application file for complete search history.

(56) References Cited

U.S. PATENT DOCUMENTS

| 6,430,577 | B1 * | 8/2002 | Hart ........................... 707/201 |
| 6,449,622 | B1 * | 9/2002 | LaRue et al. ................. 707/201 |
| 6,560,655 | B1 * | 5/2003 | Grambihler et al. ......... 709/248 |
| 6,571,146 | B1 * | 5/2003 | Dennehy ...................... 700/98 |
| 2002/0016954 | A1 * | 2/2002 | Charisius et al. ............... 717/2 |
| 2003/0110172 | A1 * | 6/2003 | Selman et al. ................ 707/10 |
| 2004/0054711 | A1 * | 3/2004 | Multer ......................... 709/201 |
| 2005/0216884 | A1 * | 9/2005 | Tchochiev ................... 717/106 |
| 2005/0268297 | A1 * | 12/2005 | Kovachka-Dimitrova et al. .......................... 717/171 |
| 2007/0180490 | A1 * | 8/2007 | Renzi et al. ..................... 726/1 |

OTHER PUBLICATIONS

DonewsBlog, "SAP J2EE Engine 6.20/6.30 FAQ", DonewsBlog, 2004, <http://blog.donews.com/stewchicken/articles/161838.aspx>.*
Gleen, "FSYNC- Program to Synchronize Windows Directories", Glenn Story, 2002, <http://home.pacbell.net/storygds/tools/fsync/fsync.htm>.*

* cited by examiner

*Primary Examiner*—James Trujillo
*Assistant Examiner*—Dawaune Conyers
(74) *Attorney, Agent, or Firm*—Mintz, Levin, Cohn, Ferris, Glovsky, and Popeo P.C.

(57) ABSTRACT

Methods and systems for synchronizing applications deployed on a test server are provided. The methods and systems may comprise a software application comprising a plurality of files deployed on a test server. After the software application is deployed on a test server, one of the plurality of files comprising the software application may be modified in a development environment. The methods and systems may comprise a synchronization manager operative to, after modification of the one of the plurality of files, synchronize only the modified file with the software application deployed on the test server.

17 Claims, 13 Drawing Sheets

SYSTEMS AND METHODS FOR COMPILING APPLICATIONS ON A TEST SERVER

TECHNICAL FIELD

This invention relates generally to building and deploying applications on a test server, and more specifically to methods and systems for synchronizing application files modified by a software developer with a software application deployed on the test server.

BACKGROUND

Development of software applications generally comprises the steps of coding, building and deploying the application. Normally, a software developer is required to make modifications to various files comprising the application during the development process. In order to test the software application, the developer typically must build the application in the development environment of a development studio and deploy it on a test server. During the building process, the development studio may determine whether all application files are syntaxically valid and generate a single binary file from the application files that is deployable on the test server. Once the single binary file is deployed on the test server, the binary files may be extracted from the single deployed file and written on the test-server system under the server root. In typical software development studios, after making a set of modifications to one or more of the files comprising an application, the developer is required to build and deploy all application files on a test server regardless of whether or not a particular file was modified since the application was last deployed. This process can be time consuming, particularly when the application is complex and comprises a large number of files. As the development process often involves a significant amount of trial and error, it may be necessary to modify, build, and deploy a program many times before finalizing a satisfactory application. Because the building and deploying process may take several minutes, vast amounts of the developer's time may be wasted waiting for the application to build and deploy. Alternatively, developers may be tempted to avoid making necessary modifications as soon as the problem is identified, instead waiting until a later point at which either the problem becomes insurmountable or a number of problems have arisen that make the time required to rebuild and re-deploy the program appear more justified. However, delaying the resolution of problems until later stages of development can make the problems more difficult to solve. Worse yet, the problem may be forgotten entirely, and the application may be released with an unsolved bug.

Certain software development environments have attempted to avoid this inefficiency by allowing software developers to track modified files and manually synchronize them with the deployed application. For example, the developer may be allowed to synchronize modified files through a Windows XCOPY command or by a drag-and-drop operation to insert the modified files into the root of the deployed application. However, while such systems do avoid much of the inefficiency of rebuilding the entire application in response to each modification, they place a great burden on the developer to track each file that has been modified since the application was last deployed. If a developer fails to remember to manually synchronize a modified file, the developer may mistakenly believe that all problems have been corrected and release a defective version of the application.

SUMMARY

A system, implemented with a computer processor, for synchronizing files comprising a development server system comprising a development environment for developing a software application comprising a plurality of files. The system may comprise a test server on which the files of the software application are deployed. The system may further comprise a synchronization manager operative to, after modification of one of the files of the software application on the development system, synchronize only the modified file between the development system and the test server.

A method for synchronizing files is provided. The method may comprise deploying a software application comprising a plurality of files from a development server system to a test server. The method may further comprise, after deploying the software application on the test server, modifying one of the plurality of files on the development system. The method may comprise determining which of the plurality of files comprising the software application have been modified since deployment of the software application on the test server. The method may also comprise synchronizing only the modified file of the software application between the development system and the test server.

A computer-readable medium that stores a set of instructions, which, when executed, performs a method for synchronizing files is provided. The method performed when the set of instructions is executed may comprise deploying a software application comprising a plurality of files from a development server system to a test server. The method may comprise, after deploying the software application on the test server, modifying one of the plurality of files on the development system. The system may further comprise determining which of the plurality of files comprising the software application have been modified since deployment of the software application on the test server. The method may also comprise synchronizing only the modified file of the software application between the development system and the test server.

It is to be understood that both the foregoing general description and the following detailed description are exemplary and explanatory only and are not restrictive of the invention as claimed. The foregoing background and summary are not intended to provide any independent limitations on the claimed invention.

BRIEF DESCRIPTION OF THE DRAWINGS

The accompanying drawings, which are incorporated in and constitute a part of this specification, illustrate several implementations of the invention and together with the description, serve to explain the principles of the invention. In the drawings.

DETAILED DESCRIPTION

The following description refers to the accompanying drawings in which, in the absence of a contrary representation, the same numbers in different drawings represent similar elements. The implementations in the following description do not represent all implementations consistent with principles of the claimed invention. Instead, they are merely some examples of systems and methods consistent with those principles. It is to be understood that both the foregoing general description and the following detailed description are exemplary and explanatory only and are not restrictive of the invention as claimed.

As embodied herein, methods and systems for synchronizing application files modified by a software developer with a version of the application deployed on a test server are provided. Consistent with the principles of the present invention, a synchronization manager may be provided that associates project files created and modifiable in a development environment with the corresponding application files deployed on a test server. The synchronization manager may further synchronize the modified files with the application deployed on the server. If necessary, the synchronization manager may also be restart the application after synchronization.

Figure 1:
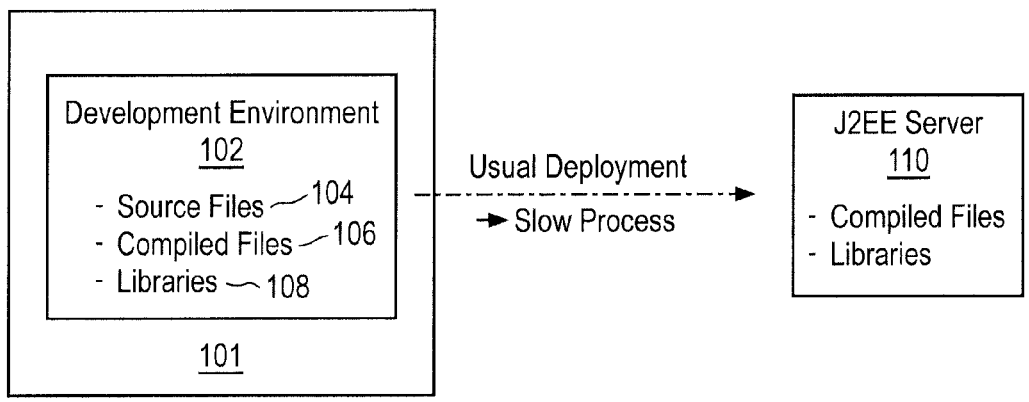
FIG. 1 is a flow diagram illustrating the operation of a development studio known in the art.

FIG. 1 illustrates the operation of an exemplary system 100 as known in the art. The system comprises a development system 101 including a development environment 102. Source files 104, compiled files 106, and library files 108 may be located in development environment 102. Files 104, 106 and 108 may be compiled in development environment 102, built into a single binary file, and deployed on a test server 110. Commonly, the process of building and deploying applications may take several minutes. Although build and deploy time varies widely depending on the size of the application and the capabilities of the system, it is not unusual for the building and deploying process to take as long as 45 minutes. Because application files are frequently modified during the development process, a significant amount of man-hours are wasted during building and deploying.

Figure 2:
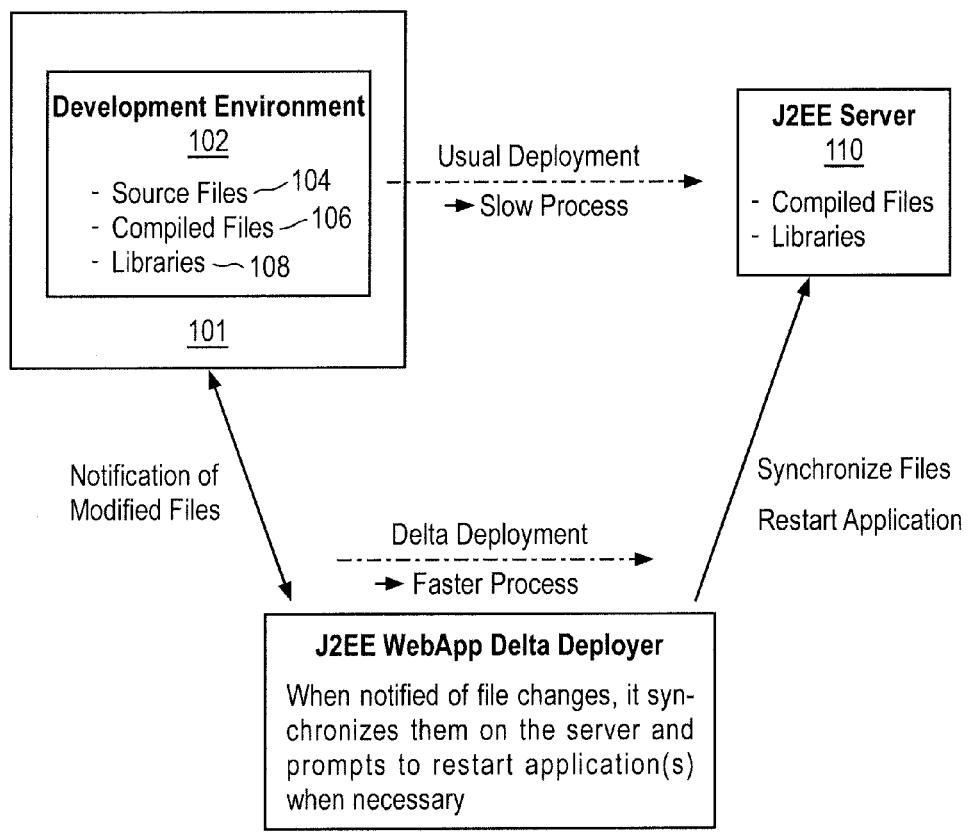
FIG. 2 is a flow diagram illustrating the operation of a synchronization manager consistent with the principles of the present invention.

FIG. 2 illustrates a system 200 consistent with the principles of the present invention. System 200 may comprise a development environment 102 in a development system 101. Project files, such as source files 104, compiled files 106, and library files 108, may be developed in development environment 102. System 200 may also comprise a test server 110 on which an application built from files 104, 106, and 108 may be deployed. However, to avoid the need to completely rebuild and re-deploy an application each time a single file is modified, system 200 may further comprise a synchronization manager 202.

System 200 may associate files 104, 106 and 108 created in the development environment with particular application(s). Files 104, 106 and 108 may be modified by the software developer after the initial deployment of an application, necessitating synchronization of the modified files with the corresponding files of the deployed application located on test server 110. Synchronization manager 202 may receive notification when any of files 104, 106 or 108 are modified. For example, the development environment in which the project files are created and modified may raise an event notifying synchronization manager 202 that a file associated with an application monitored by synchronization manager 202 has been modified. After receiving notice of a file modification, synchronization manager 202 may synchronize the modified files with the corresponding files contained in the deployed application. If necessary, synchronization manager 202 may restart a deployed application after synchronization, so as to allow, for example, an application file cached in temporary memory by test server 110 to refresh with the modified version. Thus, by synchronizing files modified in the development environment with the corresponding files deployed on test server 110, synchronization manager 202 eliminates the need for system 200 to build the entire application into a deployable binary file and deploy the entire application on test server 110. Instead, synchronization manager 202 may build and deploy only the modified files, greatly reducing the time necessary to synchronize the deployed files with those modified in the development environment.

In one aspect, the application need not be initially built into a single binary file and deployed on test server 110, as is commonly required in prior art systems. Instead, synchronization manager 202 may be used to install, or deploy, application files on test server 110 individually. If synchronization manager 202 is used to initially install an application on test server 110, synchronization manager 202 may recognize that the newly installed application does not yet exist on test server 110 and create the application on the root of server 110, into which all application files may be installed.

In addition to synchronizing files after notification of modification from the development environment, synchronization manager 202 may be triggered by a user command to synchronize files. In response to a user command to synchronize, synchronization manager 202 may compare timestamps of files deployed on the test server and the corresponding files stored locally to determine which files have been modified. If the timestamp of a in development system 101 stored file is later than the timestamp of the file deployed on the test server, synchronization manager 202 may synchronize the version of that file on the test server with the modified, locally stored version. In addition to responding to a user command to synchronize any modified file between the development system and the test server, synchronization manager 202 may respond to user commands to synchronize specific files. In such a case, synchronization manager may synchronize the files regardless of timestamps or, alternatively, may synchronize the files only if the locally stored version has a later timestamp than the version deployed on the test server.

By synchronizing only modified files, system 200 may avoid the need to completely rebuild and re-deploy an application each time one of its files 104, 106, or 108 is modified. This may drastically reduce the time required to re-compile a deployed application. In some cases, synchronization time may be reduced from as many as several minutes to less than one second. Thus, synchronization systems and methods consistent with the present invention may remove building and deploying time as a consideration in the software development process, encouraging software developers to modify application files as frequently as necessary.

Figure 3:
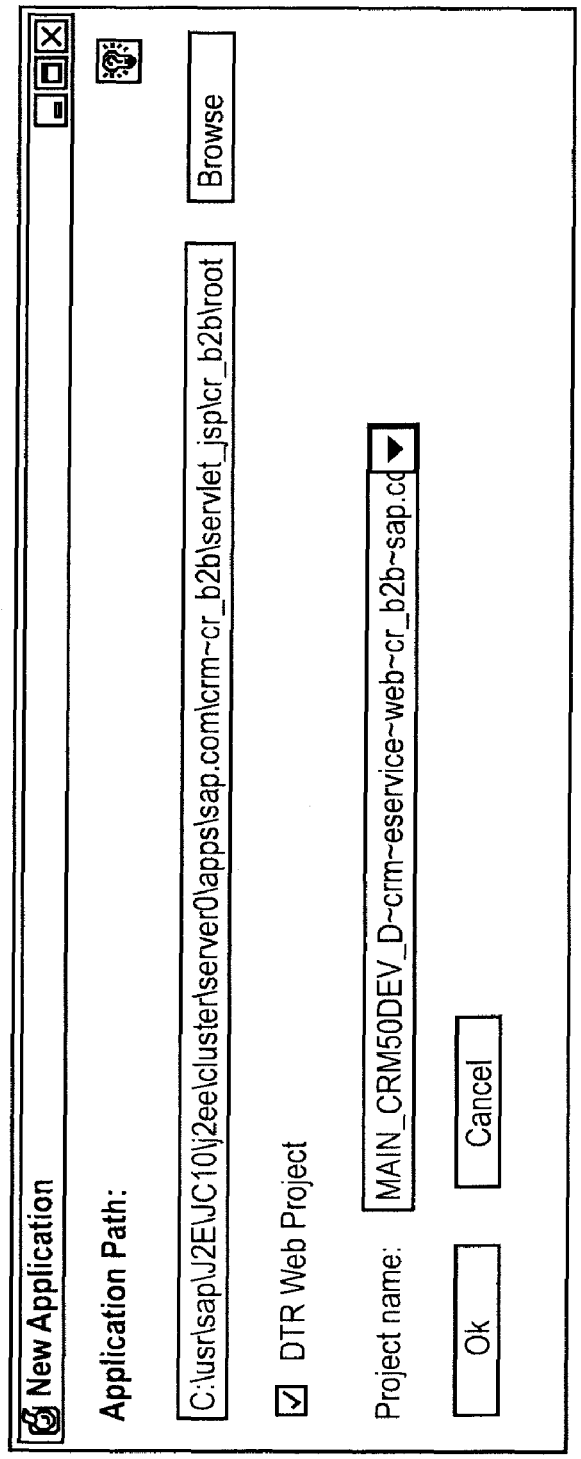
FIG. 3 is a graphic user interface allowing a user to manage software applications monitored by the synchronization manager consistent with the principles of the present invention.

Consistent with the principles of the present invention, a software developer deploying an application on a test server may direct the synchronization manager to monitor for modifications made to the files comprising the application. FIG. 3 illustrates an exemplary graphic user interface (GUI) that may be provided to allow a developer to add an application to the synchronization manager. As shown, the user may browse for an application on the test server and select an associated project name. The user may then configure the synchronization manager to associate the appropriate project files with an application monitored by the synchronization manager, such that when any of the associated files are modified in the development environment, the synchronization manager may synchronize the modified files with the application deployed on the test server. In one aspect, the developer may manually associate project files with an application monitored by the synchronization manager. In another aspect, the synchronization manager may automatically locate and associate the project files comprising a monitored application deployed on the test server. For example, the synchronization manager may recognize files associated with applications of a certain project type, such that by creating an application of a certain project type, the synchronization manager may locate files associated with that application. For example, as shown in FIG. 3, the user may indicate that an application is of the "DTR Web Project" project type. The synchronization manager may automatically detect the project files associated with a DTR-web-project application. The synchronization manager may recognize files associated with more than one project type.

Figure 4:
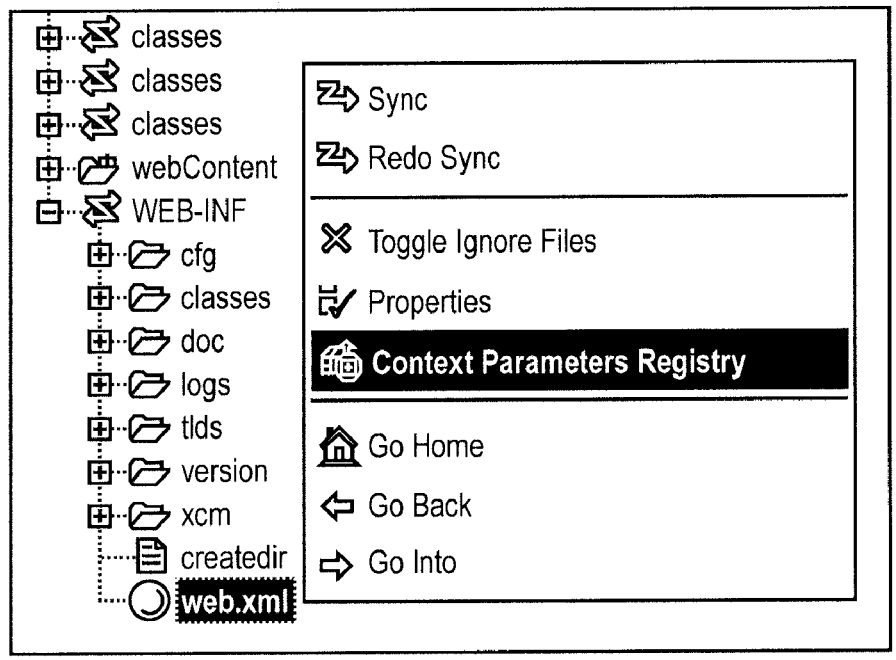
FIG. 4 is an exemplary tree-structure graphic user interface illustrating an open contextual menu of a synchronization manager consistent with the principles of the present invention.

In certain files such as, for example, a web.xml file in a J2EE web application, it may be desirable to allow the developer to specify the parameter settings for the application deployed on the test server. Because the parameter setting for the application on the test server may not be appropriate in all situations, the synchronization manager may, in one aspect, allow the developer to specify context parameters for the application deployed on the test server without modifying the project file. For example, FIG. 4 illustrates a root structure of an exemplary GUI consistent with the principles of the present invention, in which the developer may select a file and open a menu containing an option allowing context parameters to be registered for the deployed application.

Figure 5:
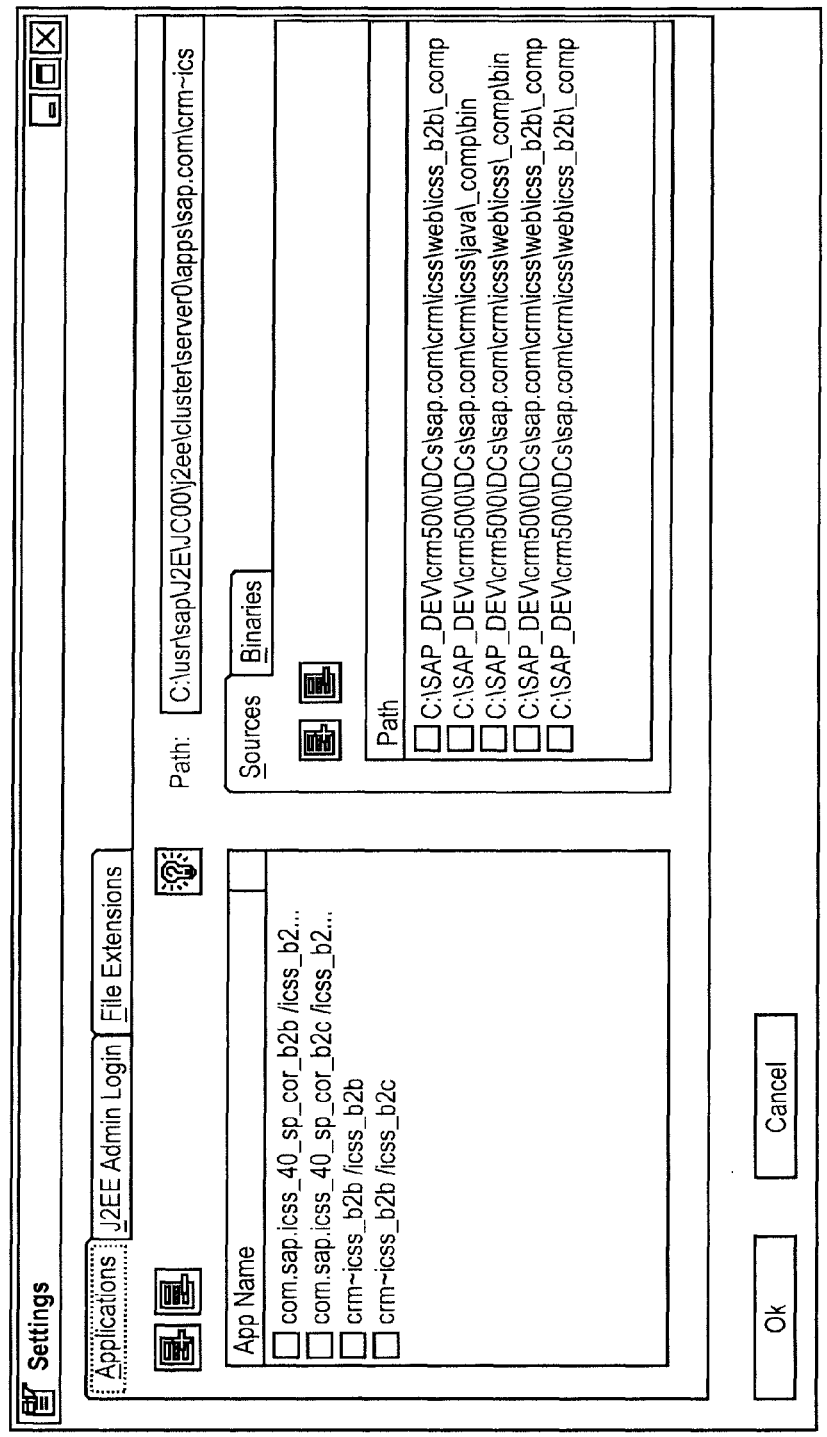
FIG. 5 is an exemplary "Applications Settings" menu of a synchronization manager consistent with the principles of the present invention.

Consistent with the principles of the present invention, the synchronization manager may also allow the developer to manage project files associated with a monitored application. FIG. 5 illustrates an exemplary GUI allowing a developer to view files associated with a particular application monitored by the synchronization manager. In one aspect, project files may be divided into various categories to allow a developer to more easily keep track of project files associated with a monitored application. For example, as illustrated in FIG. 5, project files may be divided into "sources" and "binaries" to differentiate between files created by the developer (e.g. java and jsp files) and recycled files in binary form used by the developer (e.g. class and jar files). However, the categories are for the convenience of the developer only, and the synchronization manager may treat all files identically in synchronizing with the application deployed on the test server, regardless of the category in which a file is located.

Figure 6A:
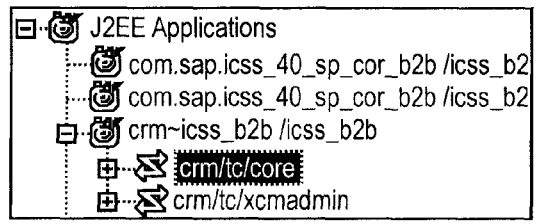
FIG. 6A is a graphic user interface illustrating a tree structure of applications monitored by the synchronization manager consistent with the principles of the present invention.
Figure 6B:
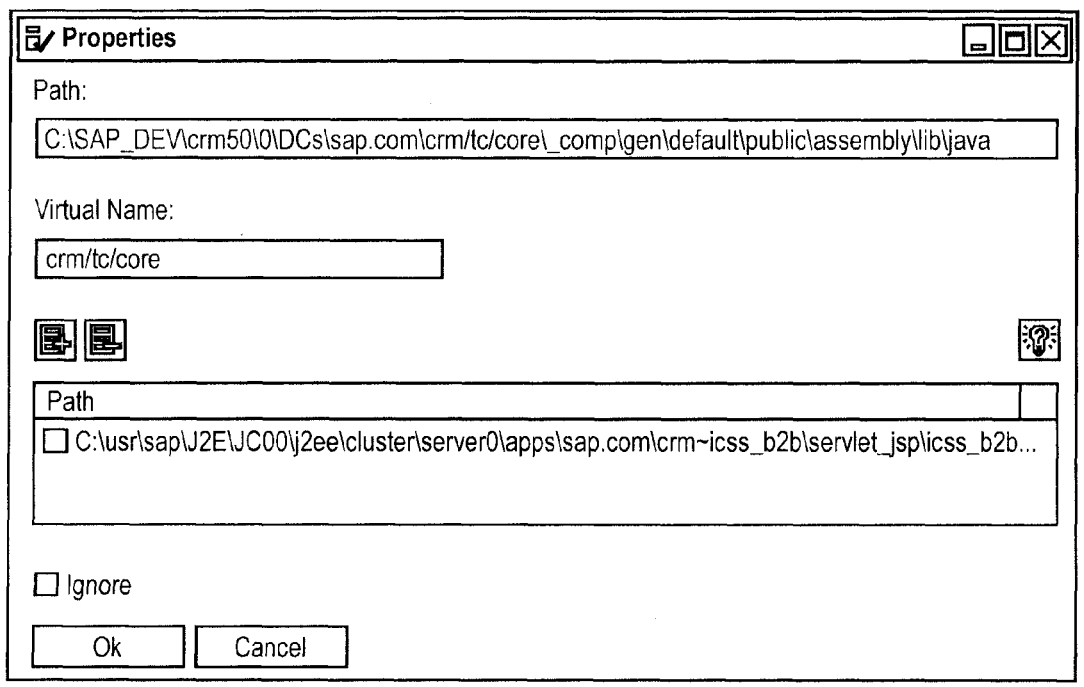
FIG. 6B illustrates an exemplary "properties" menu of a synchronization manager consistent with the principles of the present invention.

In one aspect, the synchronization manager may also allow the developer to manage the file mappings of project files associated with a monitored application. For example, as illustrated in FIGS. 6A and 6B, the synchronization manager may allow the user to select a file and open a "properties" menu. The "properties" menu may be accessible in various manners known in the art, including but not limited to right-clicking an object or highlighting an object and engaging a provided button operative to open the "properties" menu. It may also be possible to select multiple files and open a "properties" menu operative to apply changes to all of them. From the "properties" menu, the synchronization manager may allow the developer to apply a "virtual" name to a project file, changing the name of the file in the project file tree shown in the synchronization manager from the full path of the file to the "virtual" name. In FIG. 6B, the "virtual" name "crm/tc/core" is applied to the path "c:\usr\sap\J2E\JC00\j2ee\cluster\server0\apps\sap.com\crm~icss_b2b\servlet_jsp\icss_b2b . . . " Accordingly, as shown in FIG. 6A, the "virtual" name "crm/tc/core" appears in the synchronization manager tree rather than the full path name.

Figure 7:
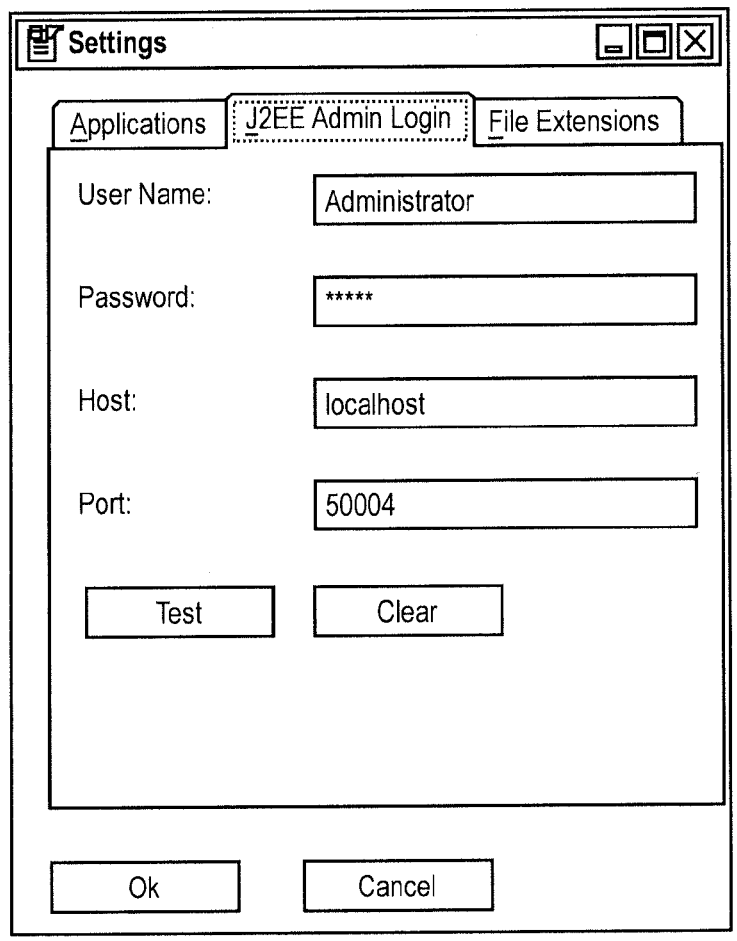
FIG. 7 illustrates an exemplary security screen of a synchronization manager consistent with the principles of the present invention.

In order for the synchronization manager to synchronize project files modified in the development environment with an application deployed on a test server, it may be necessary for the synchronization manager to log into the test server with "administrator" privileges. Accordingly, in one aspect consistent with the principles of the present invention, the synchronization manager may provide a GUI allowing the developer to input the information necessary to log into the test server. FIG. 7 illustrates an exemplary "Administrator Login" GUI operative to enable the user to enter a Username, Password, Host (i.e. server address) and Port. In one aspect, the developer may be prompted to enter the password information at the beginning of each session.

As mentioned above, after the synchronization manager synchronizes modified project files with the application deployed on the test server, it may be necessary to restart the application. This may be necessary, for example, for files that are cached by the test server in live memory to improve system performance, as the test server must replace the previously cached information with the modified information. Consistent with the present invention, the synchronization manager may cause the test server to restart the application deployed on the test server by interacting with the server through server provided client application programming interface (API).

Figure 8:
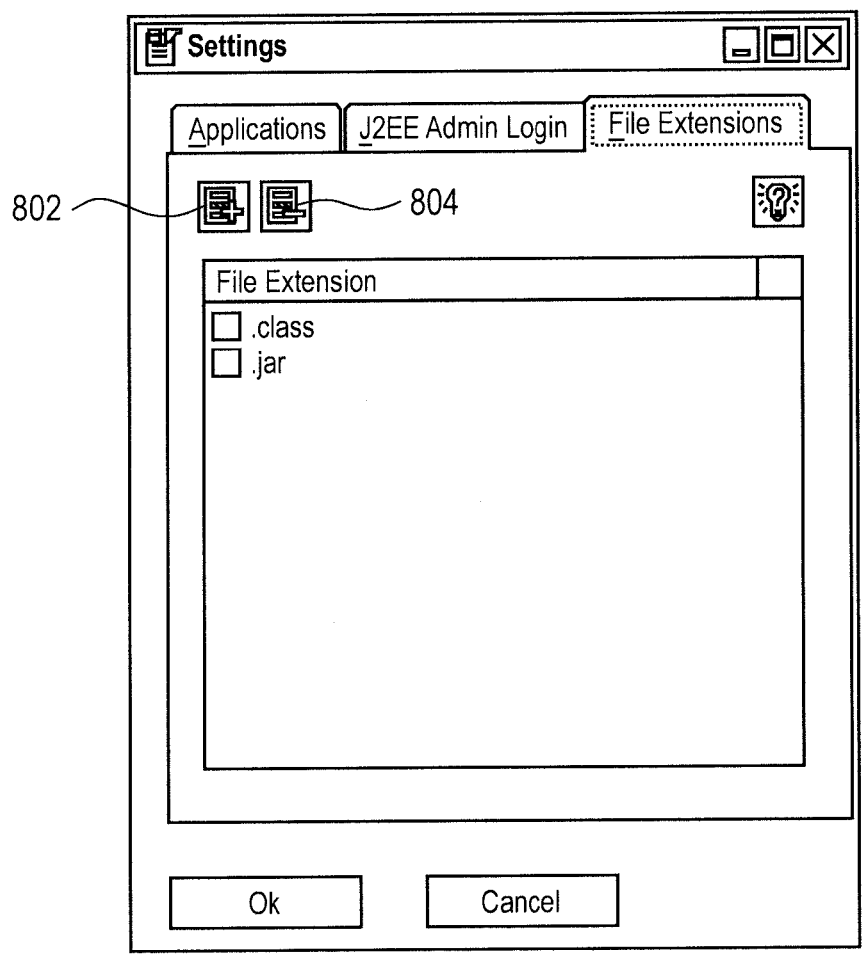
FIG. 8 illustrates an exemplary "settings" menu of a synchronization manager consistent with the principles of the present invention.

In one aspect consistent with the principles of the present invention, the synchronization manager may allow the user to manage a "restart list" of file extensions that will cause the application to be restarted after synchronization of files with any of those extensions. FIG. 8 illustrates an exemplary GUI 800 operative to enable a developer to manage a list of file extensions requiring the application to be restarted after synchronization. GUI 800 may comprise an "add" button 802 allowing the developer to add a file extension and a "remove" button 804 allowing the developer to remove a file extension from the "restart list." In one aspect, class and jar files may be added to the list by default.

In one aspect, synchronization of files with extensions on the "restart list" may cause a prompt to be displayed to the developer asking if the application should be restarted. Alternatively, the application may be automatically restarted upon synchronization of files with extensions on the "restart list." In one aspect, the synchronization manager may allow the developer to engage an option to synchronize a modified project file with a deployed application as soon as the modification to the file is made persistent in the location where the file is stored, such as the user's local hard drive, a network document management system or secondary data storage devices, such as a hard disk, floppy disk, re-writable compact disks, jump drives or zip drives. In this version, the synchronization manager may be configured such that, upon synchronizing a file having an extension on the "restart list," it does not (i) automatically restart the application or (ii) display a prompt asking the developer whether the application should be restarted. Instead, the synchronization manager may delay restarting the application until the developer affirmatively orders the application restarted. In this manner, the application is not needlessly restarted multiple times and the developer is not bothered with repeated restart prompts when modifying several files during a session.

Figure 9:
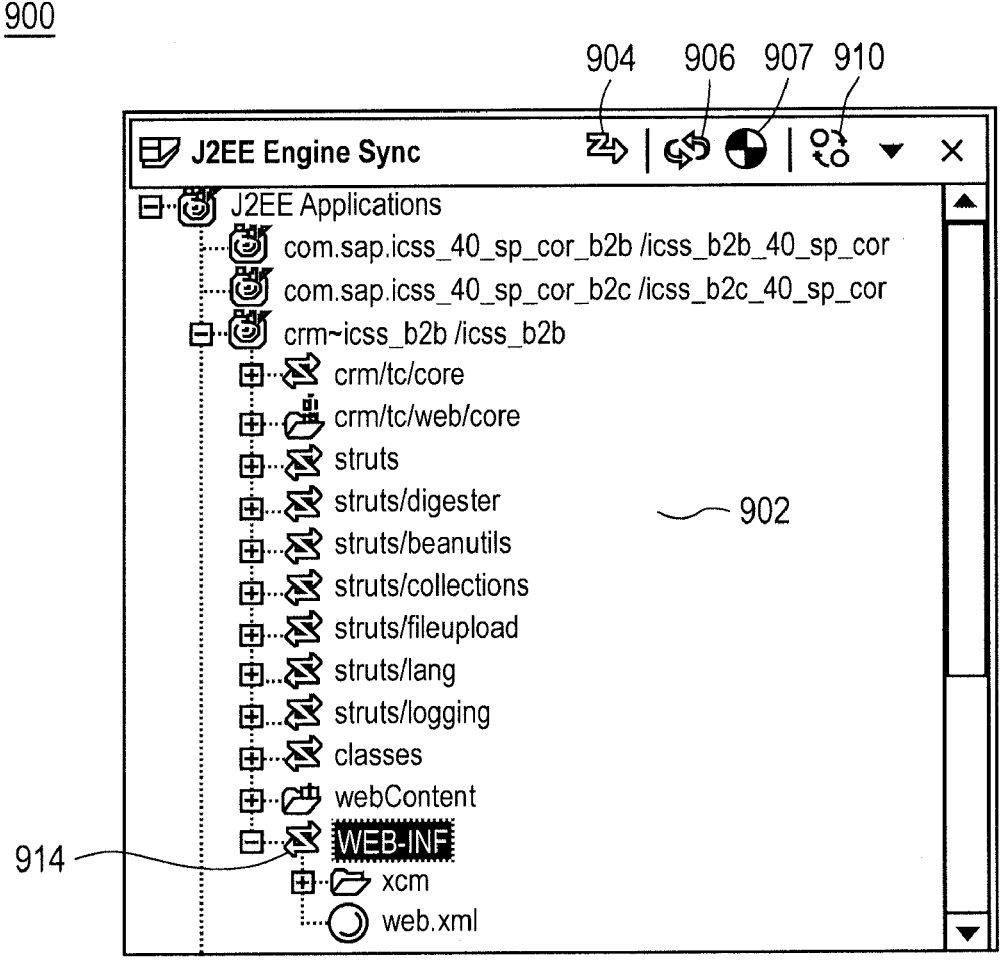
FIG. 9 illustrates an exemplary tree-structure graphic user interface of a synchronization manager consistent with the principles of the present invention.
Figure 10:
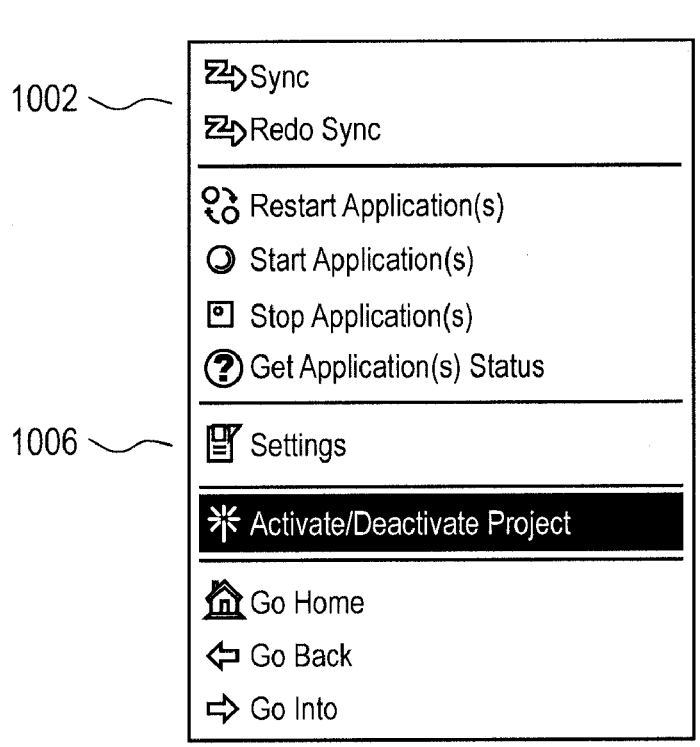
FIG. 10 illustrates an exemplary contextual menu of a synchronization manager consistent with the principles of the present invention.

FIG. 9 is an exemplary GUI 900 provided in connection with a synchronization manager consistent with the principles of the present invention. As shown in FIG. 9, GUI 900 may display a tree viewer 902 containing the files associated with a particular application monitored by the synchronization manager. FIG. 10 is an exemplary contextual menu 1000 that may be opened from GUI 900. Depending on which folder or file displayed in tree viewer 902 is in focus when contextual menu 1000 is opened, the features and options displayed therein may differ. GUI 900 and/or contextual menu 1000 may include a number of buttons or links that the developer may engage to prompt the synchronization manager to take a desired action. For example, GUI 900 and/or contextual menu 1000 may include a "sync" feature 904, which the developer may engage to synchronize selected files or folders if the content differs from the corresponding application files deployed on the test server. GUI 900 and/or contextual menu 1000 may also include a "Redo sync" feature 1002 operative to synchronize selected files or folders whether or not the content of the selected files differs from the content of the corresponding application files deployed on the test server. Contextual menu 1000 may also include a feature that may be engaged to open a menu from which the developer may change attributes of selected files or folders. GUI 900 and/or contextual menu 1000 may include a "refresh" feature 906 operative to determine whether any project files have been modified or newly created and should therefore be synchronized with the application on the server. "Refresh" feature 906 may also refresh the content of tree viewer 902. GUI 900 and/or contextual menu 1000 may also include an "update" feature 908 operative to update the structure of the tree viewer with the file system on which the project files are stored, including determining whether any files or folders need to be added or deleted. "Update" feature 908 may also determine whether any files or folders need to be synchronized.

GUI 900 and/or contextual menu 1000 may include a feature 910 operative to call an API to interface with the test server to restart the application deployed on the test server. The synchronization manager may also allow the user to engage an option to unpack a project zip file and, if needed, synchronize each file contained in the zip file with the deployed application rather than synchronizing the zip file. Similarly, the synchronization manager may allow the user to engage an option to pack a project zip file and, if needed, synchronize the single zip file rather than separately synchronizing each file contained in the zip file. The synchronization manager may also include a feature engageable to display only folders or files to be synced in tree viewer 902. Similarly, the synchronization manager may include a feature engageable to hide files or folders that are not subject to synchronizing by the synchronization manager. GUI 900 and/or menu 1000 may also include a feature allowing a user to select files that the user does not desire to be synchronized by the synchronization manager. GUI 900 and/or Contextual menu 1000 may also include navigation features, allowing the user to navigate through the application by going into a file or folder, going back to a previously visited page or returning to an application homepage, as illustrated in FIG. 10.

It is recognized that the features and functions described above are not restrictive, but are instead exemplary in nature and that a synchronization manager consistent with the principles of the present invention may not include some or all of the above-described features and may further provide additional features not described herein. It is also recognized that the features described above, as well as other features not described herein, may be provided to the developer in various manners known in the art. For example, some or all of the features may be provided to the developer through a toolbar on GUI 900. Alternatively, some or all of the features may be provided to the developer through one or more contextual menus accessible by a user in various manners. Some or all features may be accessed by the user in more than one manner.

Referring again to FIG. 9, GUI 900 may also display a number of icons in association with project files displayed in tree viewer 902 to impart information regarding the files. For example, the synchronization manager may display an icon (not pictured) in association with a folder or file that will not be synchronized. The synchronization manager may associate an icon 912 with a folder or file to indicate that it is mapped with another name on the test server. Icon 912 may appear, for example, when the developer has applied a "virtual" name to a file or folder. The synchronization manager may also associate an icon (not pictured) with a folder or file to indicate that it differs from the corresponding application file deployed on the test server.

Figure 11:
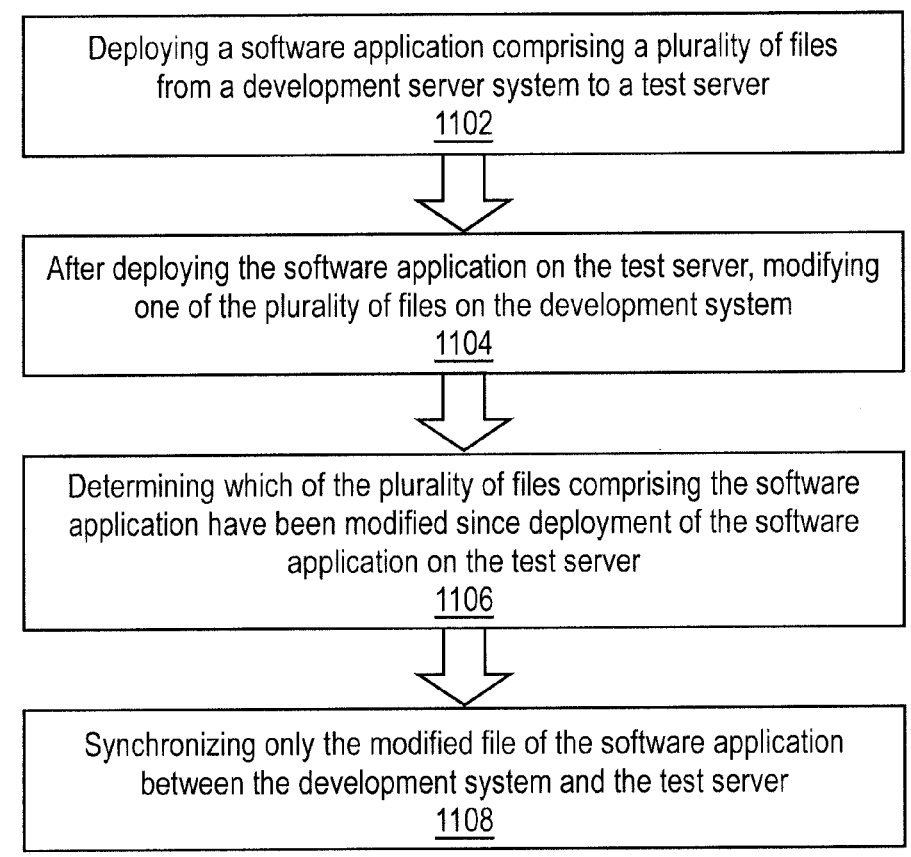
FIG. 11 is a flow chart illustrating the operation of a system consistent with the principles of the present invention.

FIG. 11 is a flow chart illustrating the operation of an exemplary system 1100 consistent with the principles of the present invention. System 1100 may deploy a software application comprising a plurality of files from a development server system to a test server (1102). After deploying the software application on the test server, one of the plurality of files may be modified on the development system (1104). System 1100 may determine which of the plurality of files comprising the software application have been modified since deployment of the software application on the test server (1106). System 1100 may be operable to synchronize only the modified file of the software application between the development system and the test server (1108).

A computer system may be used to install a software application implementing systems and methods for synchronizing files consistent with the principles of the present invention. The computer system may be a computer network, as shown in FIG. 12, or a stand-alone personal computer (PC), as shown in FIG. 13.

Figure 12:
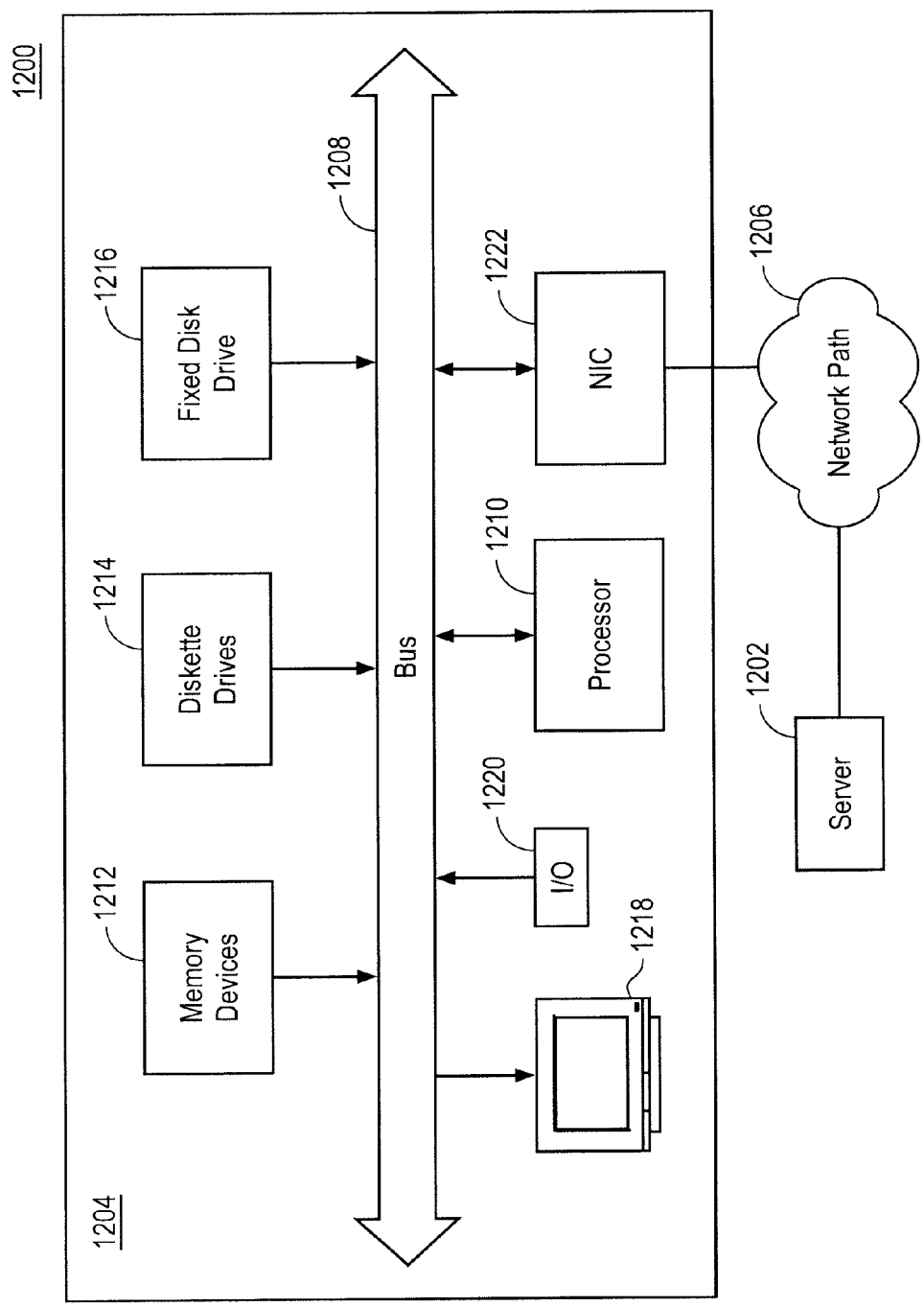
FIG. 12 illustrates a computer system for implementing a software application consistent with the principles of the present invention.
Figure 13:
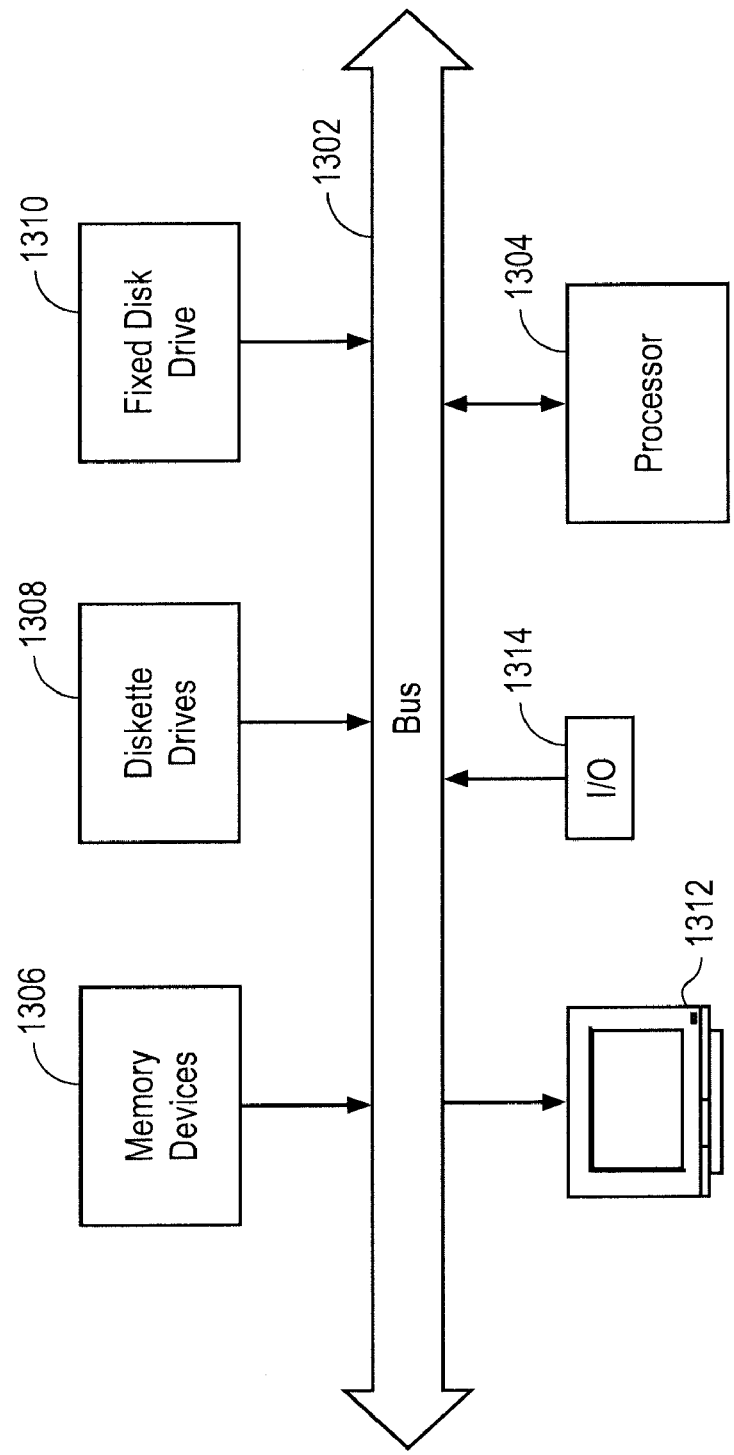
FIG. 13 illustrates another computer system for implementing a software application consistent with the principles of the present invention.

As shown in FIG. 12, a computer network 1200 for implementing a system for synchronizing files consistent with an implementation of the present invention may include a server 1202 and a stand-alone PC 1204 connected through a network path 1206. Computer network 1200 may be a local area network (LAN), where server 1202 and PC 1204 are workstations. Computer network 1200 may also be the Internet, with server 1202 hosting a web application and PC 1204 being any workstation available to a user desiring to interface with the application on server 1202. Alternatively, computer network 1200 may be a wide area network (WAN), and server 1202 and PC 1204 may lie in two separate LANs connected through the Internet.

PC 1204 may include a bus line 1208 connecting a plurality of devices such as a processor 1210, memory devices 1212 for storage of information, diskette drives 1214, a fixed disk drive 1216, a monitor 1218, other I/O devices 1220, and a network interface card (NIC) 1222. Processor 1210 may be a microprocessor such as an Intel Pentium™ chip for processing applications. Memory devices 1212 may include read-only memories (ROM) and/or random access memories (RAM). Diskette drives 1214 may include a floppy drive and/or a compact disk (CD) drive. Fixed disk drive 1216 may be a hard drive. I/O devices 1220 may include a keyboard and/or a mouse for receiving input from a user of PC 1204. Monitor 1218 may display output from processor 1210, and may also echo the input of the user. PC 1204 may be connected to network path 1206 through NIC 1222.

An application may be installed on server 1202. An individual desiring to access the application on server 1002 may use a web browser loaded on PC 1204, and may communicate with server 1202 through NIC 1222 and network path 1206. In one aspect, a software application implementing a system for synchronizing files consistent with an implementation of the present invention may be stored in PC 1204 and processor 1210 of PC 1204 may execute the software application locally within PC 1204 and interface with a web application on server 1202. Particularly, the software application may be stored on a floppy disk or a CD accessible by diskette drive 1214 or on fixed disk drive 1216. In another aspect, the software application comprising a system for synchronizing files consistent with an implementation of the present invention may be stored in server 1202, which may execute the software application, and processor 1210 of PC 1204 may communicate with server 1202 to (i) send information to server 1202 and (ii) retrieve the results of the execution of the software application from server 1202.

The synchronization of files in a manner consistent with the principles of the present invention may be achieved through the execution of the software application, either locally within PC 1204 or remotely within server 1202, the as described above.

Alternatively, as shown in FIG. 13, a stand-alone PC 1300 may be used for executing a software application for synchronizing files consistent with the principles of the present invention. PC 1300 may include a bus line 1302 connecting a plurality of devices, which may include a processor 1304, memory devices 1306 for storage of information, diskette drives 1308, a fixed disk drive 1310, a monitor 1312, and other I/O devices 1314. Processor 1304 may be a microprocessor such as an Intel Pentium™ chip for processing applications. Memory devices 1306 may include ROM and/or RAM. Diskette drives 1308 may include a floppy drive and/or a compact disk (CD) drive. Fixed disk drive 1310 may be a hard drive. Monitor 1312 may display the output of processor 1304 and may also echo the input of the user. I/O devices 1314 may include a keyboard and/or a mouse for receiving input from a user of PC 1300.

A software application comprising a system for synchronizing files consistent with an implementation of the present invention may be stored on a floppy disk or a CD accessible by diskette drive 1308 or on fixed disk drive 1310. Processor 1304 may execute the software application stored in the floppy disk the CD or the fixed disk drive 1310. An individual, through monitor 1312 and I/O devices 1314, may interact with processor 1304, which may execute the software application for synchronizing files. The software application may, for example, be embodied on a computer-readable medium which stores a set of instructions which when executed performs a method for synchronizing applications deployed on a test server.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A system for synchronizing files comprising:
a development server system comprising a development environment for developing a software application comprising a plurality of files;
a test server on which the files of the software application are deployed; and
a synchronization manager to, after modification of one of the files of the software application on the development system as indicated by an event raised by the development server system, automatically synchronize, immediately upon the modified file being persisted, only the modified file between the development system and the test server, the synchronization manager automatically restarting the software application on the test server after synchronization of a modified file of one or more predetermined file types identified by a restart list of file extensions, wherein modification of some of the plurality of files which are not of the one or more pre-determined file types does not require the software application to be restarted, the restarting of the software application causing the software application to be refreshed with the modified file;
wherein the synchronization manager automatically locates files in the development system corresponding to files of software applications of a certain project type deployed on the test server, wherein upon creation of an application of the certain project type, subsequent files associated with the created application are located by the synchronization manager, wherein the synchronization manager recognizes files associated with more than one project type.

2. The system of claim 1, wherein the synchronization manager synchronizes the modified file of the software application in response to a user command.

3. The system of claim 1, wherein the synchronization manager determines whether any of the files comprising the software application has been modified by comparing timestamps associated with the files of the software application on the development system with timestamps associated with the respective files deployed on the test server.

4. The system of claim 1, wherein a user can prompt the synchronization manager to refrain from synchronizing the modified file.

5. The system of claim 1, wherein the synchronization manager restarts the software application deployed on the test server after synchronization.

6. The system of claim 5, wherein the synchronization manager initially installs the files comprising the software application on the test server.

7. The system of claim 1, wherein the pre-determined file type is chosen by a developer of the software application.

8. The system of claim 1, wherein the synchronization manager automatically synchronizes the modified file of the software application when modification to the modified file is made persistent.

9. The system of claim 1, wherein the synchronization manager indicates to a user that the modified file has been modified and needs to be synchronized with the respective file of the software application deployed on the test server when the modification to the file is made persistent.

10. The system of claim 1, wherein the synchronization manager synchronizes a file of the software application specified by the user.

11. The system of claim 1, wherein the synchronization manager monitors and synchronizes a plurality of applications between the development system and the test server.

12. A system as in claim 1, wherein at least a portion of the application files are compressed in a project zip file and the synchronization manager unpacks the project zip file and synchronizes each file contained in the zip file with the deployed application rather than synchronizing the project zip file.

13. A method for synchronizing software applications deployed on a test server comprising:
- deploying a software application comprising a plurality of files from a development server system to a test server, at least a portion of the files for the software application having user-specified context parameters, the context parameters specifying parameters for registration with the application on the test server;
- after deploying the software application on the test server, modifying one of the plurality of files on the development system;
- determining, by a synchronization manager, which of the plurality of files comprising the software application have been modified since deployment of the software application on the test server;
- raising, by the development system, an event identifying the modified file if the context parameters require an event to be raised;
- automatically synchronizing only the modified file of the software application between the development system and the test server upon the event being raised; and
- restarting the software application deployed on the test server after synchronization if the modified file is of a pre-determined type identified by a restart list of file extensions, wherein modification of some of the plurality of files does not require the software application to be restarted, the restarting of the software application causing the software application to be refreshed with the modified file
- wherein the synchronization manager automatically locates files in the development system corresponding to files of software applications of the pre-determined type deployed on the test server, wherein upon creation of an application of the pre-determined type, subsequent files associated with the created application are located by the synchronization manager, wherein the synchronization manager recognizes files associated with more than one project type.

14. The method of claim 13, wherein determining which of the plurality of files comprising the software application have been modified comprises comparing timestamps associated with each of the plurality of files comprising the software application on the development system with timestamps associated with the plurality of respective files deployed on the test server.

15. The method of claim 13, further comprising automatically synchronizing the one modified file of the software application on the development system with the respective file deployed on the test server when modification of the modified file is made persistent.

16. The method of claim 13, further comprising notifying the synchronization manager of a modification made to one of the plurality of files.

17. A computer-readable medium which stores a set of instructions which when executed performs a method for synchronizing applications deployed on a test server, the method executed by the set of instructions comprising:
- deploying a software application comprising a plurality of files from a development server system to a test server;
- after deploying the software application on the test server, modifying one of the plurality of files on the development system;
- determining, by a synchronization manager, which of the plurality of files comprising the software application have been modified by a user of a remote client and persisted on a storage device within the remote client since deployment of the software application on the test server;
- raising, by the development system, an event identifying the modified file immediately upon persistence of the modified file;
- automatically synchronizing only the modified file of the software application between the development system and the test server; and
- restarting the software application deployed on the test server after synchronization if the modified file is of a pre-determined type identified by a restart list of file extensions, wherein modification of some of the plurality of files does not require the software application to be restarted, the restarting of the software application causing the software application to be refreshed with the modified file;
- wherein the synchronization manager automatically locates files in the development system corresponding to files of software applications of the pre-determined type deployed on the test server, wherein upon creation of an application of the pre-determined type, subsequent files associated with the created application are located by the synchronization manager, wherein the synchronization manager recognizes files associated with more than one project type.

* * * * *